(12) United States Patent
Williams

(10) Patent No.: US 6,598,462 B2
(45) Date of Patent: Jul. 29, 2003

(54) AIR FLOW MEASUREMENT

(75) Inventor: Edward Christopher Williams, Mickleover (GB)

(73) Assignee: Leamount Limited, Derby (GB)

( * ) Notice: Subject to any disclaimer, the term of this patent is extended or adjusted under 35 U.S.C. 154(b) by 0 days.

(21) Appl. No.: 10/008,181

(22) Filed: Nov. 13, 2001

(65) Prior Publication Data
US 2002/0078734 A1 Jun. 27, 2002

(30) Foreign Application Priority Data

Nov. 10, 2000 (GB) ............................................. 0027486

(51) Int. Cl.[7] .................. G01B 13/08; F15D 1/00; B23K 26/02
(52) U.S. Cl. ...................... 73/37.5; 138/40; 219/121.83
(58) Field of Search .................... 73/37, 37.5, 37.9; 138/40; 219/121.83

(56) References Cited

U.S. PATENT DOCUMENTS

| 3,750,710 A | * | 8/1973 | Hayner ....................... 138/40 |
| 4,088,009 A | | 5/1978 | Fukuda |
| 4,538,449 A | | 9/1985 | Wegmann et al. |
| 4,544,337 A | * | 10/1985 | Maruyama .................... 418/15 |
| 5,010,224 A | | 4/1991 | Shirey et al. |
| 5,089,685 A | * | 2/1992 | Schmidt-Hebbel ..... 219/121.83 |
| 5,212,980 A | | 5/1993 | Wegmann |
| 5,234,330 A | * | 8/1993 | Billow et al. ................ 425/190 |
| 5,472,009 A | * | 12/1995 | Linderoth ..................... 137/101 |
| 5,671,767 A | * | 9/1997 | Kelly ............................ 137/7 |
| 5,879,594 A | * | 3/1999 | Holtzman .................... 261/39.2 |
| 6,313,023 B1 | * | 11/2001 | Maruyama .................... 438/597 |

FOREIGN PATENT DOCUMENTS

| EP | 0356063 A2 | 2/1990 |
| EP | 0417917 A1 | 3/1991 |

OTHER PUBLICATIONS

Jun. 17, 2002, Search Report issued by the UK Patent Office for priority United Kingdom Patent Application No. 0027486.0.

* cited by examiner

Primary Examiner—Helen Kwok
Assistant Examiner—Jay L Politzer
(74) Attorney, Agent, or Firm—Cook, Alex, McFarron, Manzo, Cummings & Mehler, Ltd.

(57) ABSTRACT

An air flow measurement apparatus for verifying one or more apertures in a test piece 126 by mounting the test piece in an air flow such that air flows through the aperture(s) therein. The apparatus comprises a servo pilot valve 114 for adjusting the air flow from the source 104, a pressure sensor P3A for measuring the flow and a computer for determining the effective area of the test piece 126 at a range of different pressures across the test piece, the range including a desired pressure differential. The computer continuously tracks the readings and, when sufficient data has been obtained, computes a curve fit to calculate the effective area of the test piece 126 at the exact specified pressure differential.

The present invention avoids any problems associated with differences in atmospheric pressure as well as any problems that are associated with obtaining the exact desired pressure differential across the test piece 126.

6 Claims, 2 Drawing Sheets

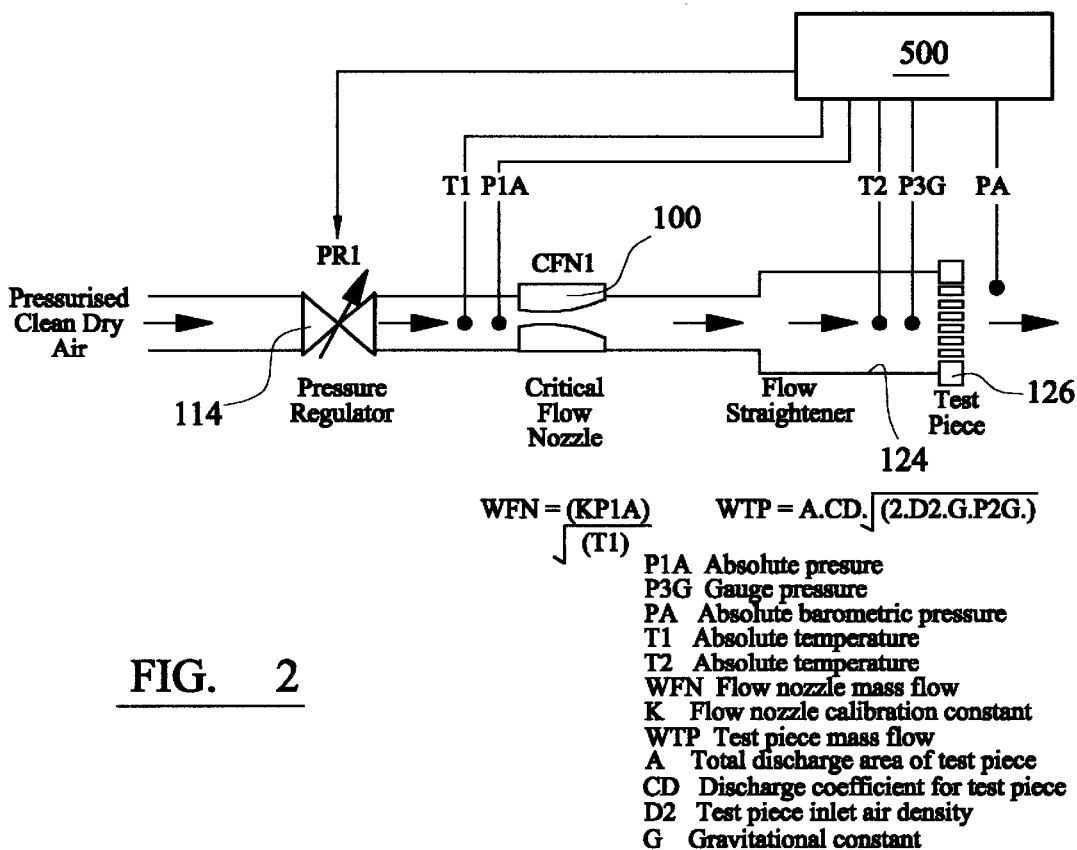

FIG. 2

$$WFN = \frac{(KP1A)}{\sqrt{(T1)}} \qquad WTP = A.CD.\sqrt{(2.D2.G.P2G.)}$$

P1A Absolute presure
P3G Gauge pressure
PA Absolute barometric pressure
T1 Absolute temperature
T2 Absolute temperature
WFN Flow nozzle mass flow
K Flow nozzle calibration constant
WTP Test piece mass flow
A Total discharge area of test piece
CD Discharge coefficient for test piece
D2 Test piece inlet air density
G Gravitational constant

| Item Ref. | Description | Supplier/Part Details |
|---|---|---|
| 106 | Air/Water filter | IMI Norgren - Olympian Series 25 micron |
| 110 | Accumulator | Cool Technology Ltd. - carbon steel receiver 127 litres capacity |
| 112 | Fine particle/oil filter | IMI Norgren - Olympian Series Puraire |
|  | Pilot operated pressure regulator and pilot valve | IMI Norgren - 3/4" regulator type 11-808-960 IMI Norgren pilot regulator type 11400-2G1PG100 |
| 108/118/120 | Ball valves | Swaglog Whitey Ball Valve - 3/4" |
| 122 | Pressure relief valve | IMI Norgren - relief valve type 40AC-6/PX100 |
| P1A PA P3G | Pressure instrumentation | Druck Ltd. PDCR 900 series pressure transducers and DPI 280 series transmitters with RS232 option |
| T1 T2 | Temperature instrumentation | Omega Ltd. PT100 type resistance therometers and Druck Ltd. DPI 280 series transmitters with Druck Ltd. RS232 option |
| 100/101 | Critical flow nozzles | Flowdyne Inc., Texas, USA |
|  | Pipe work and miscellaneous fittings | Swaglok |
|  |  |  |

AIR FLOW MEASUREMENT

BACKGROUND OF THE INVENTION

1. Field of the Invention

This invention relates to a method and apparatus for the measurement and calibration of fluid flow through work pieces having one or more apertures and, in particular, to a method and apparatus for testing such work pieces and verifying that the apertures have been adequately formed.

2. Related Background Art

It is well known to form apertures, bores, etc. in work pieces, such as gas turbine blades and vane cooling holes, fuel nozzles, combustion chamber cooling holes, and the like. A variety of different processes are used to form such apertures, including casting, mechanical machining, for example drilling, electrical machining, for example electrical discharge machining (EDM), electrochemical machining such as capillary drilling, or combination of such processes.

It is usually desirable and, in some applications, essential to verify that such aperture or bores have been correctly formed so that they provide the desired amount of fluid flow under specified conditions, thereby ensuring correct operation of the work piece in question and minimizing the probability of failure of a component during use.

The present invention is based on a modification of a known type of airflow test system for the above purpose and in order to fully understand the invention, the known system will now be described with reference to FIGS. 1 and 2 which show an embodiment of the present invention including parts of the known system. The known system is based on the use of critical flow nozzles 100,102. The system comprises an air inlet 104 through which pressurized air, typically at 7 Bar absolute (for example from a factory compressor or the like) passes to an air/water filter 106 via a ball valve 108. The air then passes to an accumulator 110, which may be a carbon steel receiver typically of 127 liter capacity, and from there to a fine particle/oil filter 112. Thus, pressurized clean, dry air passes to the critical flow nozzles 100,102 via a pilot operated pressure regulator 114. The pilot operated pressure regulator 114 can be adjusted to control the pressure P1A at the inlet to the critical flow nozzles 100,102, and thus the mass flow rate through the nozzles 100,102 to a test station 116. Airflow to the test station 116 is selectively controlled via respective ball valves 118,120, and a pressure relief valve 122 is provided at the inlet to the test station 116, to protect the work station pressure transducers from damage due to accidental over pressurization.

FIG. 2 is a schematic view of the system of FIG. 1, with the air/water filter accumulator and fine particle/oil filter omitted. Further, for clarity, only one of the critical flow nozzles 100 is shown. Thus, in use, pressurized clean, dry air flows through the critical flow nozzles 100,102 via a pressure regulator 114. The absolute air pressure P1A and the temperature T1 at the inlet of the critical flow nozzles 100,102 are measured and the mass flow of air from the outlet of each critical flow nozzle 100 can be calculated using the equation:

$$WFN = \frac{(K \cdot P1A)}{\sqrt{T1}}$$

where:

WFN=flow nozzle mass flow;

P1A=absolute air pressure;

T1=absolute temperature; and

K=flow nozzle calibration constant (usually provided for the nozzle by its manufacturer).

The total mass flow through the critical flow nozzles 100,102 is the sum of the mass flows calculated for each of the critical flow nozzles through which air is flowing, i.e. the nozzles whose respective valves 118,120 are open.

This known total mass airflow then passes to the work test station 116, which typically includes a flow straightener 124. The work test station 116 is designed to support, seal and clamp the work piece 126 to be tested so that all of the air from the critical flow nozzles 100,102 passes through it, but it will be apparent to persons skilled in the art that such supporting, sealing and clamping arrangements (not shown) will be different for each type of test piece, as each type has its own specific requirements.

The gauge air pressure P3G and the absolute temperature T2 are measured at the inlet to the test piece 126, as is the absolute (barometric) air pressure PA of the air as it exits the test piece 126. It will be appreciated that the absolute pressure PA of the air as it exits the test piece 126 will be atmospheric pressure if the system vents to atmosphere.

The pressure ratio PR can be calculated using the following equation:

$$PR = \frac{PA + P3G}{PA}$$

and various test piece characteristics can be determined. For example, the effective area of the test piece can be calculated using the following equation:

$$AEFF = \frac{WTP}{\sqrt{2.D2.(P3G)}}$$

where:

AEFF=effective area of test piece;

D2=test piece inlet density; and

WTP=test piece mass flow=$A.CD \sqrt{2.D2.G.P3G}$ where:

A=total discharge area of test piece;

CD=discharge coefficient for test piece; and

G=gravitational constant.

This assumes that the cross-sectional area of the flow straightener is sufficiently large compared to the test piece cross-sectional area that the total absolute pressure at P3G tapping can be assumed to be equal to the static absolute pressure (P3G+PA), i.e. the flow velocity at the tapping is very low. If this is not the case the equation needs to be corrected for the dynamic pressure (kinetic head).

Thus, with kinetic head correction, this becomes:

$$AEFF = \frac{WTP}{\sqrt{2.D2.(PD)}}$$

where:

PD=test piece total differential pressure drop, i.e. including dynamic pressure.

The flow parameter of the test piece can be calculated using the following equation:

$$FP = \frac{WTP\sqrt{T2}}{P1} = AEFF\sqrt{\frac{2.(PR-1)}{PA.R}}$$

where:

R=gas constant

FP=flow parameter of test piece; and

P1=test piece absolute inlet pressure.

There are, in fact, a wide range of test piece characteristics which can be measured, and those chosen to be measured and/or calculated within any particular system are dependent upon user requirements.

A typical test specification requires the fluid pressure at the inlet to the test piece 126 to be adjusted to a particular pressure ratio (or equivalent parameter), and then the desired characteristics of the test piece to be determined, for example, the effective area, discharge coefficient, flow parameters, etc.

In conventional systems, the desired pressure ratio is obtained by manual or automatic adjustment of the fluid flow rate through the test piece. It will be appreciated that in a typical test, where the test piece 126 is vented to atmosphere, the inlet pressure required to give the desired pressure ratio depends on the atmospheric (barometric pressure) and therefore with time. Further, the altitude at which the test is conducted can be very significant. In any event, it is relatively difficult to achieve a stable exact setting, and a setting tolerance is therefore allowed. Even then, manual setting is quite skilled and time consuming. In addition, as the flow characteristics of a typical test piece are quite often very sensitive to pressure ratio (due, for example, to the complexity and variations in size of their internal passages) the error due to incorrect setting can be very significant, for example, +1–0.5% compared to an overall error budget of 1%.

We have now devised an arrangement which overcomes the problems outlined above.

SUMMARY OF THE INVENTION

Thus, in accordance with a first aspect of the present invention, there is provided fluid flow measurement apparatus for verifying one or more apertures in an object, such as a work piece, the apparatus comprising a source of pressurized fluid and adjustment means for adjusting the fluid flow from the source, means for measuring said fluid flow, means for mounting or otherwise arranging a test piece in the fluid flow from the source such that fluid flows through the at least one aperture therein, means for measuring at least one test piece characteristic at each of a plurality of test conditions in a range, said range including a predetermined desired test condition, and processing means for calculating a mathematical function or equation derived from said plurality of measured test piece characteristics and test conditions and determining from said mathematical function or equation the test piece characteristic which corresponds to said predetermined desired test condition.

Also in accordance with the first aspect of the present invention, there is provided a method of verifying one or more apertures in an object, such as a work piece, the method comprising the steps of providing a source of pressurized fluid, means for measuring fluid flow from the source and adjustment means for adjusting said fluid flow, mounting or otherwise arranging a test piece in the fluid flow from the source such that fluid flows through the at least one aperture therein, measuring at least one test piece characteristic at each of a plurality of test conditions in a range by adjusting said fluid flow from the source, said range including a predetermined desired test condition, calculating a mathematical function or equation derived from said plurality of measured test piece characteristics and test conditions and determining from said mathematical function or equation the test piece characteristic which substantially exactly corresponds to said predetermined desired test condition.

Thus, the test piece characteristic can be determined at the desired test condition to a high degree of accuracy without the need to set the measured test condition precisely at the desired condition.

According to a preferred embodiment, the first aspect of the invention provides a method of verifying one or more apertures in a work piece, the method comprising the steps of:

connecting an adjustable source of fluid flow to the test piece, adjusting the fluid flow until a measured test condition (e.g. pressure ratio) is near a predetermined desired value, allowing the flow conditions to stabilize if necessary, recording the measured test condition and a measured test piece characteristic (e.g. effective area) at said predetermined desired test condition, adjusting the fluid flow a plurality of times so that the measured test condition passes either side of said predetermined desired test condition and recording the values of the test condition and corresponding test piece characteristic each time, processing the recorded data to produce a mathematical function or equation for test piece characteristic versus test condition and using the function or equation to determine the test piece characteristic at said predetermined desired test condition.

The preferred embodiment of the first aspect of the invention extends to an apparatus having means for carrying out each of the above method steps.

Preferably the test condition is the test piece pressure ratio and the test fluid is preferably air.

A control computer (not shown) is provided in the system of FIGS. 1 and 2, and all of the pressure and temperature measurements are read by the control computer, via, for example, a RS232 Serial interface connected to the measurement channels. The control computer may also control the pilot valve of the pilot operated pressure regulator 114 and valves, depending on the system configuration, although in other cases, these are operated manually.

The control computer also provides facilities for creating, modifying and storing test procedures and specifications, selecting a procedure created previously, executing a test procedure selected previously, storing, printing and displaying test results, etc.

Before a flow test can be performed, a test procedure must be created using the test procedure creation facilities on the control computer to define the system settings to perform the test. A test procedure usually defines the critical flow nozzle channels to be used and the pressure ratios to be set. In conventional systems, these are usually derived from a test specification prepared by the engineer who designed the test piece 126.

However, in some cases, no prior data exists and the procedure must be generated by trying the part on the system to establish the most suitable flow channels, pressure ratios, and other parameters to use. In other cases, the available data is in different units to that used on the airflow system. As a result of these, and other factors, it can often be a time consuming and skilled task to create a satisfactory test procedure for a new unknown test piece.

Thus, in accordance with a second aspect of the present invention, there is provided fluid flow measurement apparatus for verifying one or more apertures in an object, such as a work piece, the apparatus comprising a source of pressurized fluid, means for mounting or otherwise arranging a test piece in the fluid flow from the source such that fluid flows through the at least one aperture therein, measurement means for measuring at least one test piece characteristic at at least one test condition, and means for automatically creating a test procedure for a test piece, said test procedure at least including a desired test condition for said test piece.

A preferred embodiment of the second aspect of the invention includes one or more of the following features:
 intelligent test procedure editor which uses the critical flow nozzle equations to 'build' the test procedure from basic test piece data information,
 automatic conversion between different units,
 a self programming operating mode with procedures that either provide operator prompts to interactively flow a test piece on the system and create a suitable test procedure, or if the system is fitted with automatic valves to automatically flow a test piece on the system and create a suitable test procedure,
 a standard automatic test cycle that can be performed on an unknown test piece to obtain its flow characteristic over a full range of flow conditions.

BRIEF DESCRIPTION OF THE DRAWINGS

An exemplary embodiment of the invention will now be described with reference to the above-mentioned drawings, in which:

FIG. 2 is a schematic representation of the system of FIG. 1, with a number of components omitted for the purposes of clarity.

DETAILED DESCRIPTION OF THE PREFERRED EMBODIMENT

Figure 1:
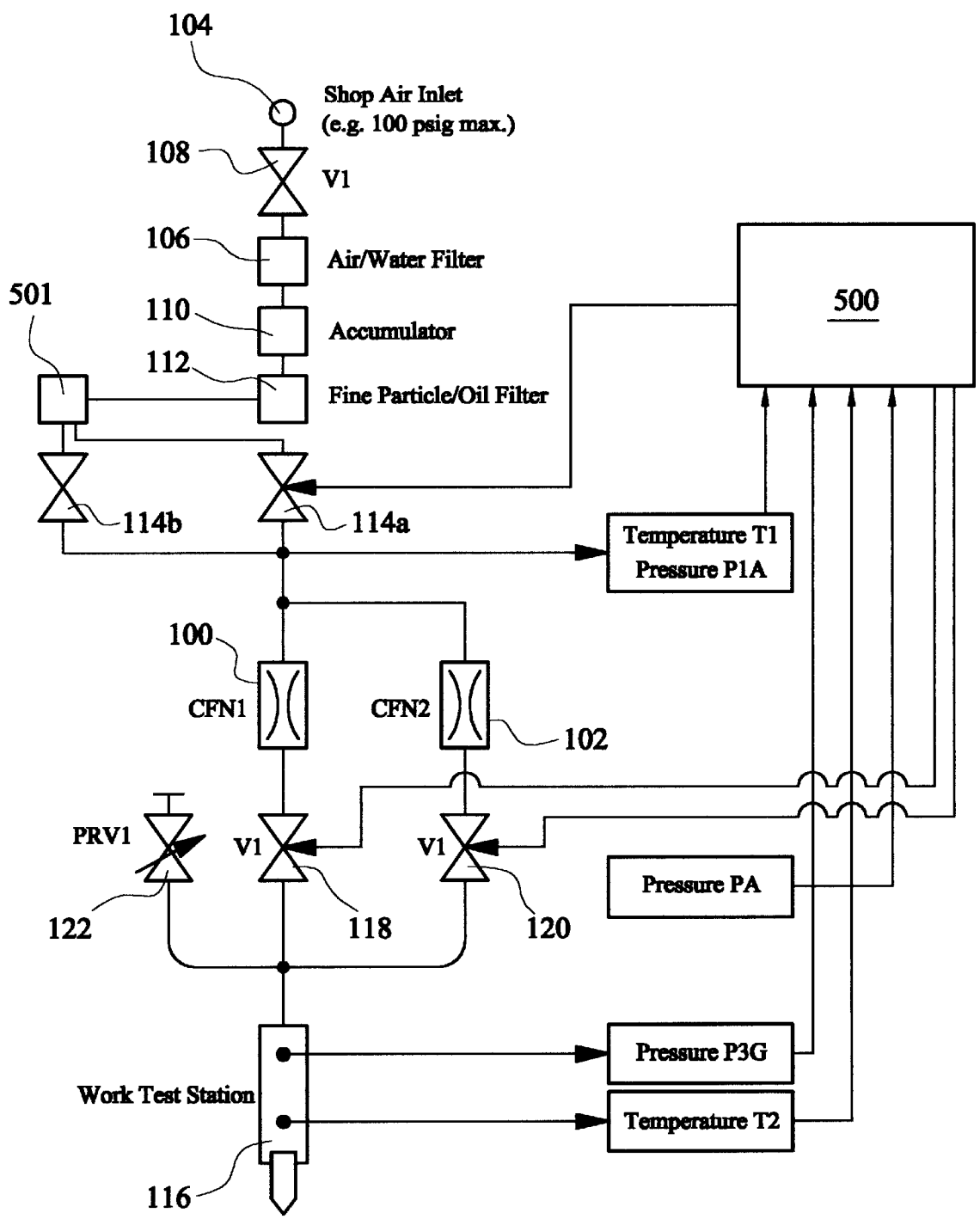
FIG. 1 is a schematic block diagram of an embodiment of airflow test system in accordance with this invention.

An exemplary embodiment of an air flow measurement system according to the present invention is similar comprises:
 a computer 500 for measuring, recording and/or calculating test conditions for a work piece to be tested, such means being suitable for use with both manually operated and automatic system,
 a motorized pilot pressure valve 114a under the control of the computer 500,
 a manually operated pilot valve connected in parallel 114b,
 a changeover valve 501 for selecting either the manual pilot valve 114b, or automatic pilot valve 114a,
 automatic critical flow nozzle selection valves 118, 120 under control of the computer 500, and
 automatic pressure channel selection valves (not shown) under control of the computer 500.

Manual Pilot Valve Control—In this case, the operator is prompted by the control computer 500 to adjust the pilot valve 114b to achieve the approximate desired pressure ratio setting and then to raise and lower the setting to pass either side of the actual desired setting. Data readings are taken continuously until the apparatus is able to generate or compute a best curve fit through the setting point with 'sufficient' accuracy.

Automatic Pilot Valve Control—In this case, the computer 500 also performs the functions of the operator to adjust the pilot valve 114a as well as generating or calculating the curve fit.

The envisaged voice control system incorporated in an exemplary embodiment of the third aspect of the invention comprises:

PC sound card, headphones and microphone attached to computer 500 in a manner well known in the art, and airflow voice control software.

During operation of an airflow test procedure the voice control software provides voice message prompts to the operator at the same time these are displayed on the monitor screen. Similarly instead of making a keyboard stroke or entry to control the test, the operator can speak these through the microphone.

As stated above, performing flow test, a test procedure must be created using the air flow system test procedure creation facilities provided in the control computer 500 in order to define the system settings to perform the test.

In addition to conventional editing facilities, the control computer 500 provides a set of functions which an operator can use to facilitate and simplify the creation of a test procedure. Amongst the facilities provided are:
 intelligent test procedure editor which uses the critical flow nozzle equations to 'build' the test procedure from basic test piece data information,
 automatic conversion between different units,
 a self programming operating mode with procedures that either provide operator prompts to interactively flow a test piece on the system and create a suitable test procedure, or if the system is fitted with automatic valves to automatically flow a test piece on the system and create a suitable test procedure,
 a standard automatic test cycle that can be performed on an unknown test piece to obtain its flow characteristic over a full range of flow condition.

The control apparatus also allows the desired test piece characteristic required to be measured, including effective area, flow parameter, etc., to be defined, together with relevant information relating to the test station, such as the internal diameter (or area) of the flow straightener, to allow kinetic head corrections to test piece pressure drop P3G, etc. Further, characteristics values of an associated reference master can be entered or generated (as explained below) corresponding to each of the test points in the test procedure.

Any one of the plurality of previously created and stored test procedures may be selected, and a flow test method is then required to be selected as follows.

Two Flow Test Methods can be selected:
 Absolute Test Mode in which case the test piece characteristic is measured using critical flow nozzle calibration information, as described further below,
 Master Comparison Mode in which case the test piece characteristic is measured relative to the reference master characteristic provided in the test procedure.

In the case of Master Comparison; before a test piece can be measured it is necessary to perform a Test Cycle on the reference master. In this cycle the master is tested in absolute mode and at each test point a master calibration ratio (MCR)

is calculated and stored with the test procedure data. The ratio is:

MCR (given test point)=(Stored Master test piece characteristic at given test point)/(Measured Master test piece characteristic value at same test point).

When test pieces are then measured in Master Comparison mode the measurement of the characteristic is made at each test point using the same procedure as in Absolute Mode and then multiplied by the stored MCR corresponding to each test point.

MCR values can be regenerated and/or checked at regular intervals (e.g. daily or weekly) thus removing long term drift errors.

The advantage of this mode of operation is that the system does not require precise absolute calibration but only stable repeatable operation over the intervals between generating and regenerating MCR values.

Following selection of a flow test procedure it can then be executed to test test pieces.

If Master Comparison testing is selected then a further option is used to select if the Master is to be tested to create and store the MCR data values, or if a test piece test is to be performed. The system will require that MCR data is created for the test procedure before any test pieces can be measured in this mode.

Except as described above the execution of a test procedure is identical in both Absolute and Master Comparison Modes.

The operator is guided by detailed step-by-step prompts at each stage of the test procedure. The guidance prompts depend on whether the operator is required to manually adjust valve settings etc., or if these are automatic.

The typical steps are:

load a test piece at the test station and enter its description or serial number, select flow nozzles by opening/closing valves, adjust the pilot regulating pressure valve until the test piece pressure ratio is near the desired set value for the first set point. Here near means typically about 5% to 10% of the desired set point, dwell sufficiently long for conditions to stabilize—this depends on flow rate, pipe volumes etc., and is typically between 10 and 60 seconds, the system starts to automatically measure and calculate pressure ratio values and corresponding test piece characteristic data values (e.g. effective area), the operator or computer adjusts the pilot pressure regulator to change the pressure ratio to different settings near (within about 5% to 10%) to the set point so that it passes either side of the setting position. As this is happening the computer continues reading data and calculating pressure ratio and corresponding test piece characteristic data values for all pressure ratios near the set point. The data is used to compute a least squares straight line curve fit (regression fit) of test piece characteristic versus pressure ratio, and also the standard deviation of the fitted data. The calculation is repeated as additional data is obtained, once sufficient data is obtained, determined usually by the standard deviation approaching a limit or reducing below a specified value the curve fit is used to calculate the test piece characteristic at the set point pressure ratio, the system will then step on to the next set point to be tested and the above procedure is repeated, this is repeated until all test points defined in the test procedure have been completed, the results may then be discarded, stored in memory, printed out, transferred to an external store etc., or a combination of these actions, the test procedure is now complete and the system prompts for the test piece to be unloaded ready for the next cycle.

In some situations the test piece may not be suitable for attaching to a test station or the cost of a suitable fixture cannot be justified. For example when it is desired to test a small sector of holes on a large part such as a gas turbine combustion chamber liner. In this case the flow straightener may be attached to a flexible tube and its output end fitted with a silicon rubber skirt that has been previously molded to create a seal between the flow straightener and the test piece. A frequent procedure is then for the operator to hold the flow straightener in position on the test piece during a test. He must obviously concentrate on ensuring the position is correct and the skirt seals properly and is therefore unable to observe or operate the test procedure. A second operator is therefore needed to assist. In order to eliminate the need for this second person the control software can be operated by voice (spoken) commands, and the computer can also output spoken information concerning the results and progress of each step.

Other features of this exemplary embodiment of the present invention include:

procedures for testing leak integrity and periodic calibration, additional critical flow nozzle channels all connected to the same inlet plenum (P1A) with individual isolation valves. One or more nozzles can be selected for a given test procedure. The total flow through the test piece is then the summation of the flows provided by each selected nozzle.

Many other embodiments of the invention are possible including the use of flow measuring devices such as: orifice plates; rotameters; V cones (as supplied by McCrometer Inc., USA); direct mass flow meters (Coriolis meter); thermal mass flow meters, etc.

The source of flow may be pressurized air or other gases (including bottled gas); fans; moving piston in a cylinder (especially for low flows); etc. etc.

The method of flow adjustment may include inlet pressure adjustment; throttling by a control valve; changing fan speed; partial diversion of the flow; etc. etc.

Large systems are often based on 'suction' whereby a fan will draw air through the system so that in this case the air entering the test piece is typically at atmospheric pressure and the inlet to the flow measurement device (e.g. V cone) will be slightly below atmospheric pressure.

The equation to be fitted may not be a straight line but may be another relationship e.g. a polynomial, or an equation that is expected from theory to express the relation between pressure ratio and the test characteristic being measured.

A specific embodiment of the present invention has been described above by way of example only and it will be apparent to persons skilled in the art that modifications and variations are envisaged and can be made without departing from the scope of the invention.

Thus, in summary, the first aspect of the invention provides a facility whereby a precise pressure regulator setting is not required. Rather, in the case of a manual system, i.e. the pressure regulator and valves are controlled manually, the operator adjusts the settings so the pressure rises and falls slowly through the required setting (i.e. the setting which gives the required pressure ratio). The computer continuously tracks the readings and, when sufficient data has been obtained, computes a curve fit to calculate the result at the exact specified setting. In the case of an automatic system, the servo pilot valve will be automatically adjusted to perform the same function.

The third aspect of the invention allows hands free operation of the system thereby eliminating the costly need for two operators when testing parts in certain applications, and Functions are provided by the second aspect of the invention whereby the system can determine adaptively appropriate system settings for new or unknown test pieces attached to it. This preferably includes post editing facilities to allow a test program to be 'tailored' as desired which is particularly attractive for 'jobbing' calibration laboratories when testing short batches of many types of parts.

In some situations, the test piece 126 may not be suitable for attaching to a test station, or the cost of suitable fixture may be unjustifiable. For example, when it is desired to test a small sector of holes on a large part, such as a gas turbine combustion chamber liner. In this case, the flow straightener 124 may be attached to a flexible tube and its output end fitted with a silicon rubber skirt that has been previously molded to create a seal between the flow straightener 124 and the test piece 125.

Frequently, in this situation, an operator must hold the flow straightener in position on the test piece during a test, during which time the operator must concentrate on ensuring that the position is correct and that the skirt seals properly. A single operator is then therefore unable to observe or operate the test procedure in these circumstances, and a second operator is required to assist, which is obviously an inefficient use of manpower.

Thus, in accordance with a third aspect of the invention, there is provided fluid flow measurement apparatus for verifying one or more apertures in an object, such as a work piece, the apparatus comprising a source of pressurized fluid, means for mounting or otherwise arranging a test piece in the fluid flow from the source such that fluid flows through the at least one aperture therein, means for measuring at least one test piece, characteristic at at least one test condition, and voice activated means for operating said measuring means.

I claim:

1. A fluid flow measurement apparatus for verifying one or more apertures in an object, the apparatus comprising a source of pressurized fluid and adjustment means for adjusting the fluid flow from the source, means for measuring said fluid flow, means for mounting or otherwise arranging a test piece in the fluid flow from the source such that fluid flows through the at least one aperture therein, means for measuring at least one test piece characteristic at each of a plurality of test conditions in a range, said range including a predetermined desired test condition, and processing means for calculating a mathematical function or equation derived from said plurality of measured test piece characteristics and test conditions and determining from said mathematical function or equation the test piece characteristic which corresponds to said predetermined desired test condition.

2. A fluid flow measurement apparatus as claimed in claim 1, comprising means for automatically creating a test procedure for a said object, said test procedure at least including said desired test condition for said test piece.

3. A fluid flow measurement apparatus as claimed in claim 1, comprising voice activated means for operating said measuring means.

4. A method of verifying one or more apertures in an object, the method comprising the steps of providing a source of pressurized fluid, means for measuring fluid flow from the source and adjustment means for adjusting said fluid flow, mounting or otherwise arranging a test piece in the fluid flow from the source such that fluid flows through the at least one aperture therein, measuring at least one test piece characteristic at each of a plurality of test conditions in a range by adjusting said fluid flow from the source, said range including a predetermined desired test condition, calculating a mathematical function or equation derived from said plurality of measured test piece characteristics and test conditions and determining from said mathematical function or equation the test piece characteristic which substantially exactly corresponds to said predetermined desired test condition.

5. A method as claimed in claim 4, comprising the steps of:

connecting an adjustable source of fluid flow to the test piece, adjusting the fluid flow until a measured test condition is near a predetermined desired value, allowing the flow conditions to stabilize if necessary, recording the measured test condition and a measured test piece characteristic at said predetermined desired test condition, adjusting the fluid flow a plurality of times so that the measured test condition passes either side of said predetermined desired test condition and recording the values of the test condition and corresponding test piece characteristic each time, processing the recorded data to produce a mathematical function or equation for test piece characteristic versus test condition and using the function or equation to determine the test piece characteristic at said predetermined desired test condition.

6. A method as claimed in claim 5, in which the test condition is the test piece pressure ratio and the test fluid is preferably air.

\* \* \* \* \*